United States Patent
Mathias et al.

(10) Patent No.: US 11,560,948 B2
(45) Date of Patent: Jan. 24, 2023

(54) SEAL SYSTEM

(71) Applicant: UNI-GRIP, INC., Upper Sandusky, OH (US)

(72) Inventors: Andrew Mathias, Upper Sandusky, OH (US); Kip Alspach, Upper Sandusky, OH (US); Doug Parsell, Upper Sandusky, OH (US); John Newman, Upper Sandusky, OH (US); Creston Kinley, Upper Sandusky, OH (US); Gary Steinmetz, Upper Sandusky, OH (US); Josh Weatherholtz, Upper Sandusky, OH (US); Charles Billeg, Upper Sandusky, OH (US); Christopher Vent, Upper Sandusky, OH (US)

(73) Assignee: Uni-Grip, Inc., Upper Sandusky, OH (US)

( * ) Notice: Subject to any disclaimer, the term of this patent is extended or adjusted under 35 U.S.C. 154(b) by 127 days.

(21) Appl. No.: 16/894,333

(22) Filed: Jun. 5, 2020

(65) Prior Publication Data
US 2020/0386311 A1    Dec. 10, 2020

Related U.S. Application Data

(60) Provisional application No. 62/857,645, filed on Jun. 5, 2019.

(51) Int. Cl.
*F16J 15/02* (2006.01)
*B60P 3/34* (2006.01)

(52) U.S. Cl.
CPC .............. *F16J 15/027* (2013.01); *B60P 3/34* (2013.01); *F16J 15/025* (2013.01)

(58) Field of Classification Search
CPC .. B60P 3/34; B60P 3/341; B60R 13/06; B60J 10/24; B60J 10/30; B60J 10/36; F16J 15/021; F16J 15/022; F16J 15/025; F16J 15/027; F16J 15/061
See application file for complete search history.

(56) References Cited

U.S. PATENT DOCUMENTS

| | | | |
|---|---|---|---|
| 2,593,206 | A | 4/1952 | Short |
| 3,701,351 | A | 10/1972 | Harvey |
| 6,966,590 | B1 | 11/2005 | Ksiezopolki et al. |
| 7,540,116 | B1 | 6/2009 | Martinson |
| 7,614,676 | B2 | 11/2009 | Ksiezopolki et al. |
| 7,614,677 | B2 | 11/2009 | Ksiezopolki et al. |
| 8,408,625 | B1 | 4/2013 | Ksiezopolki et al. |
| 8,701,351 | B2 | 4/2014 | Siegel |
| 8,875,443 | B2 | 11/2014 | Siegel |

(Continued)

*Primary Examiner* — Nicholas L Foster
(74) *Attorney, Agent, or Firm* — McDonnell Boehnen Hulbert & Berghoff LLP

(57) ABSTRACT

A seal device for sealing slide-out room opening in recreational vehicles. The seal including a base; a bulb; an alignment aid member; and a positional member. The base having a proximal end, a distal end, an inside portion, an outside portion, and a perpendicular member. The bulb having an arcuate portion, a sidewall portion and a curled end portion. The positional member extending perpendicularly to the base distal end in opposite direction of the alignment aid member. The seal device may further include a flap extending co-linearly from the base distal end and a fastening system.

20 Claims, 7 Drawing Sheets

(56) References Cited

U.S. PATENT DOCUMENTS

| | | | |
|---|---|---|---|
| 8,910,422 B2 | 12/2014 | Siegel | |
| 9,038,322 B2 * | 5/2015 | Ksiezopolski | F16J 15/022 |
| | | | 52/79.5 |
| 9,045,027 B2 | 6/2015 | Young et al. | |
| 9,528,241 B2 * | 12/2016 | Hargrave | F16J 15/068 |
| 9,625,037 B2 | 4/2017 | Young et al. | |
| 9,951,874 B2 * | 4/2018 | Kseizopolski | B60J 10/00 |
| 10,208,860 B2 | 2/2019 | Young et al. | |
| 10,323,749 B2 * | 6/2019 | Maloney | F16J 15/027 |
| 2014/0097578 A1 * | 4/2014 | Young | F16J 15/027 |
| | | | 277/628 |
| 2014/0203522 A1 * | 7/2014 | Ksiezopolski | B60J 10/00 |
| | | | 277/634 |
| 2015/0260287 A1 * | 9/2015 | Young | B60J 10/00 |
| | | | 277/312 |
| 2015/0291236 A1 * | 10/2015 | Kseizopolski | F16J 15/50 |
| | | | 277/637 |
| 2016/0003358 A1 * | 1/2016 | Young | B60J 10/00 |
| | | | 277/645 |
| 2016/0115666 A1 * | 4/2016 | Hargrave | F16J 15/027 |
| | | | 405/274 |
| 2016/0207438 A1 * | 7/2016 | Ksiezopolski | F16J 15/021 |
| 2018/0080558 A1 * | 3/2018 | Maloney | B60J 10/00 |

* cited by examiner

SEAL SYSTEM

This non-provisional patent application claims priority to and the benefit of U.S. Provisional Application No. 62/857,645, filed on Jun. 5, 2019, and incorporated herein in its entirety.

The popularity of expansion slide-outs in recreational vehicles keeps increasing as the industry of motorhomes expands and motorhome ownership becomes more widespread. Slide-out rooms create a more spacious environment providing for a better enjoyment of the recreational vehicle. However, adding slide-outs to motorhomes may present some challenges.

One of the main challenges of the addition of slide-out rooms to a recreational vehicle is having adequate sealing around the opening of the expansion slide-out. Obtaining and maintaining a watertight seal around the slide-out is of upmost importance. Typically, rubber seals are used for sealing slide-out rooms. However, the installation and eventual replacement of said rubber seals can be cumbersome. Therefore, there is still a need for a sealing system that provides a watertight seal and is both easy to install and to replace.

Currently disclosed is a seal comprising: a base; a bulb; an alignment aid member; and a positional member. The base comprising a proximal end, a distal end, an inside portion, an outside portion, and a perpendicular member, said perpendicular member extending perpendicularly to the base proximal end towards the bulb. The base may further comprise a recess.

The bulb of the seal comprises an arcuate portion, a sidewall portion and a curled end portion. The sidewall portion may be joined to the base perpendicular member and the curled end portion may be unattached. The positional member extends perpendicularly to the base distal end in opposite direction of the alignment aid member.

The seal may further comprise a flap extending co-linearly from the base distal end. The seal may also comprise a fastening system. The fastening system may include adhesive tape. Alternatively, or additionally, the fastening system may include at least one fastener.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION OF THE DRAWINGS

Figure 1:
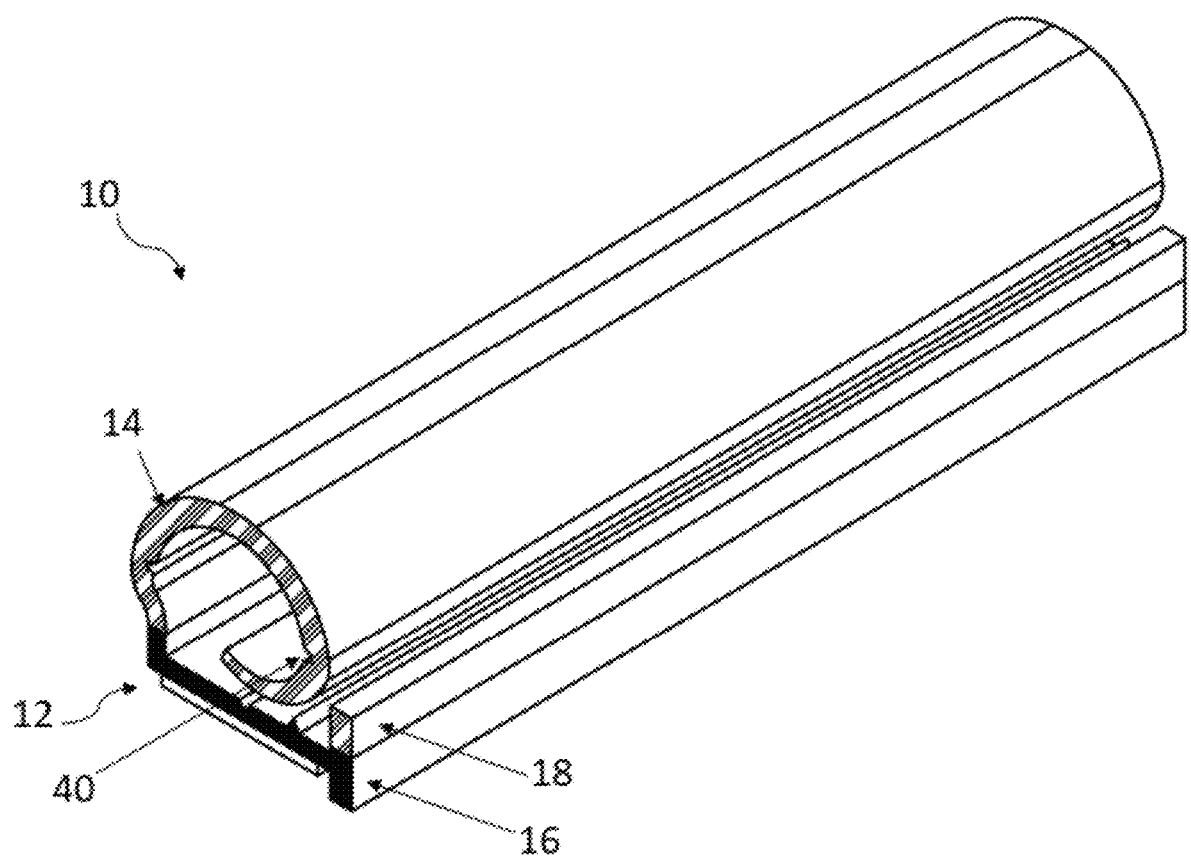
FIG. 1 is a perspective view of the seal.
Figure 2:
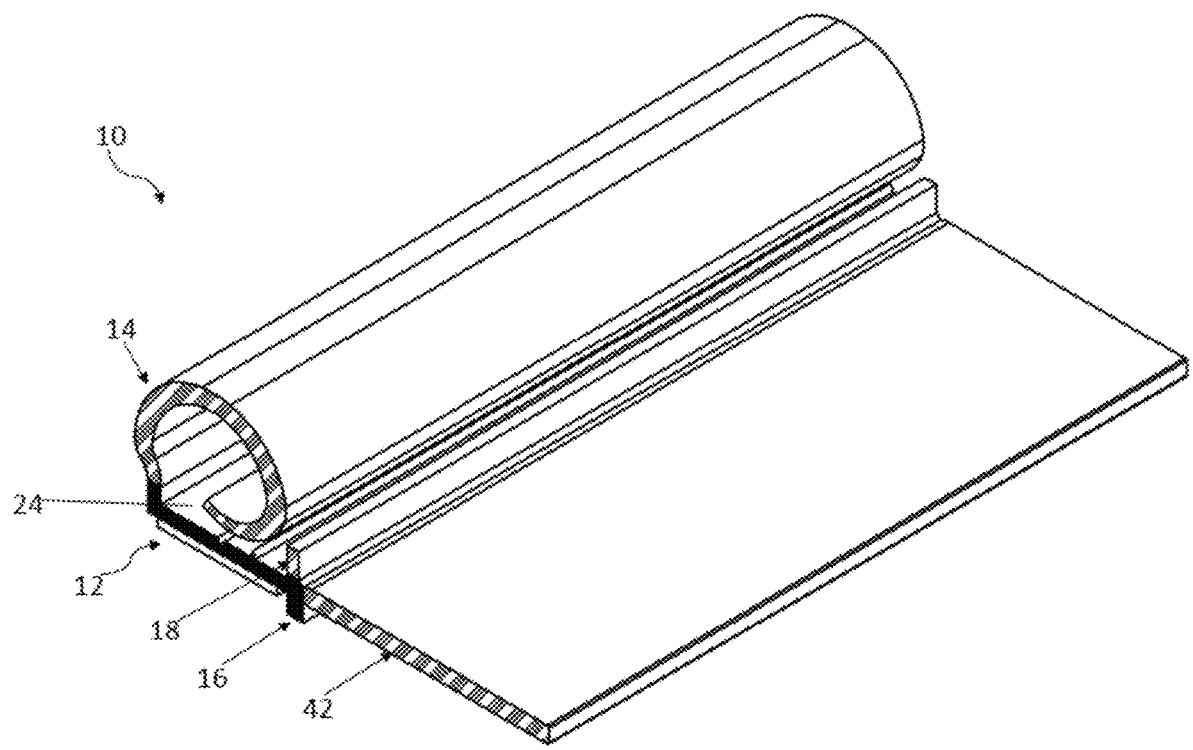
FIG. 2 is a perspective view of the seal.

FIGS. 1 to 7 disclose the currently claimed invention. Currently claimed is a seal 10 for slide-out room openings in recreational vehicles, said seal 10 comprising a base 12, a bulb 14, an alignment aid member 16, and a positional member 18. Base 12 comprises a proximal end 20, a distal end 22, an inside portion 24, an outside portion 26, and a perpendicular member 28. The perpendicular member 28 extends perpendicularly from the base proximal end 20 towards the bulb 14.

Base 12 may further comprise a recess 30 located on the inside portion 24 of the base. The base 12 may further comprise a fastening system 32. The fastening system 32 may comprise a fastener. The fastener is placed on the inside portion 24 of the base through recess 30 attaching the seal to the recreational vehicle exterior wall. Alternatively, or in addition, fastening system 32 may comprise an adhesive tape located on the outside portion 26 of the base. The adhesive tape provides for extra adhesion to the wall of the slide-out opening in the recreational vehicle. Furthermore, the adhesive tape provides for additional watertight seal. Moreover, the adhesive tape helps with the installation of the seal.

Figure 3:
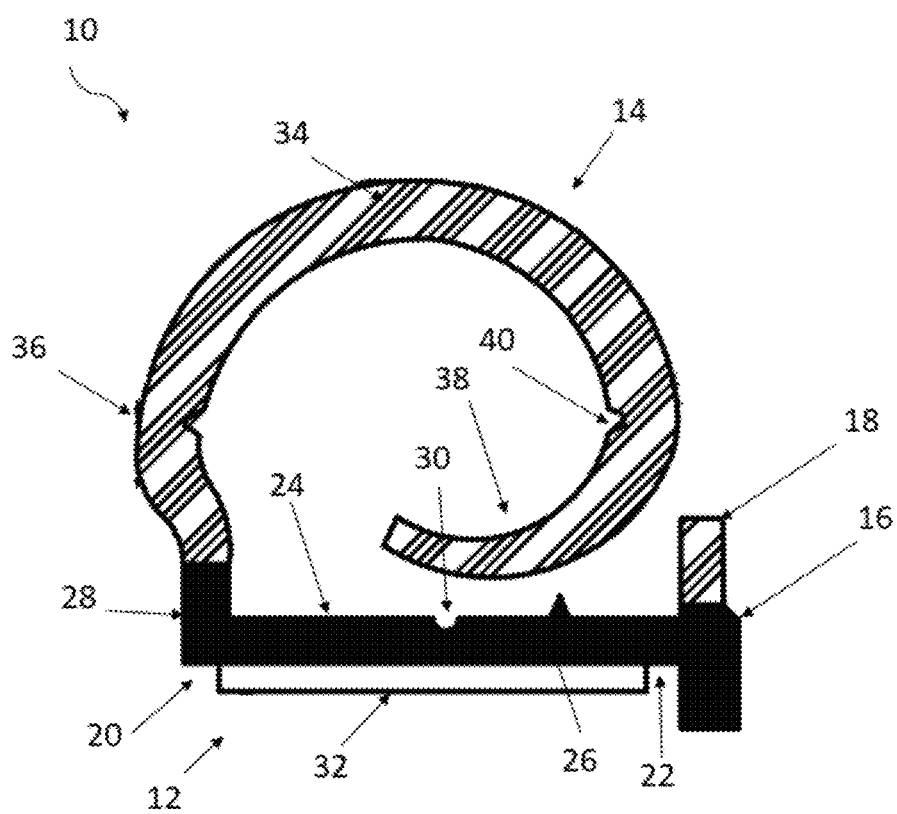
FIG. 3 is a side-view of the seal.
Figure 4:
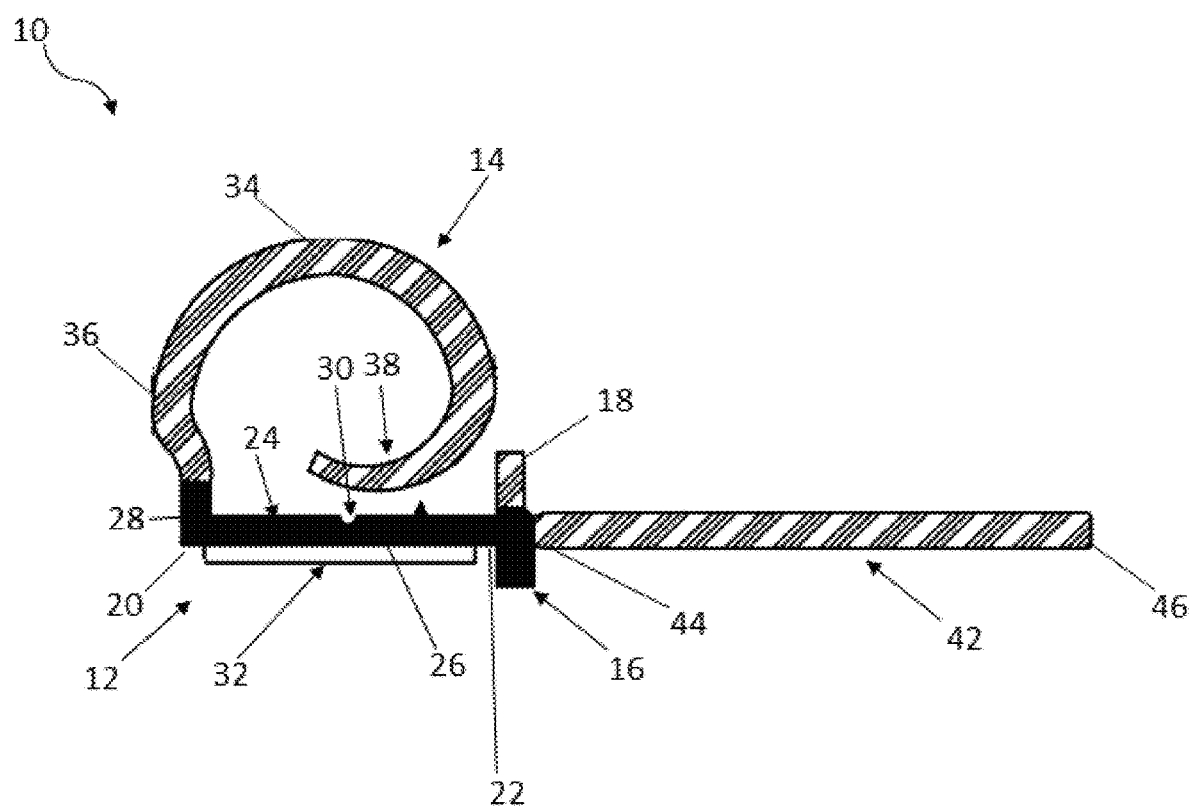
FIG. 4 is a side-view of the seal.

As illustrated in FIGS. 3 and 4, bulb 14 comprises an arcuate portion 34, a sidewall portion 36, and curled end portion 38. The arcuate portion 34 is integrally joined to the sidewall portion 36 on one side and to the curled end portion 38 on the other side. The curled end portion 38 is unattached or open-ended and extends towards the sidewall portion.

The sidewall portion 36 of the bulb 14 extends toward the perpendicular member 28 at the proximal end 20 of the base 12 and is integrally joined to the base. The bulb 14 is joined to one side of the base allowing the bulb to be moved from a first open position to a second closed position. The first open position allowing access to the inside portion of the base. As shown in FIG. 1, the bulb 14 may further comprises at least one indentation 40. The at least one indentation 40 further allows the bulb to be readily deformable when pressed against the base. When the bulb is pressed against the base, the positional member 18 prevents the bulb 14 from completely flattening out against the base 12 providing a watertight seal.

Figure 5:
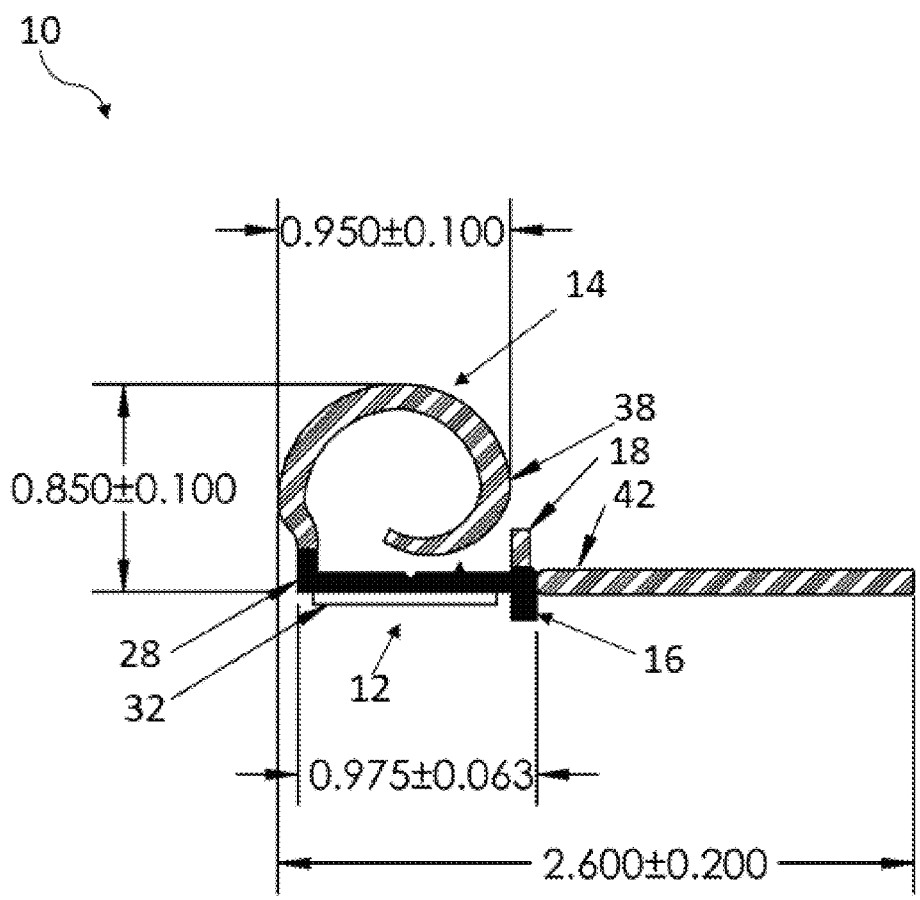
FIG. 5 is a side-view of the seal.

As shown in FIG. 5, the bulb 14 may have a width between 0.8 and 1.1 inches, preferably between 0.95 and 1.00 inches. The seal 10 may have a height between 0.7 and 1.0 inches, preferably between 0.85 and 1.00 inches. Said height is measured from the base 12 to the top part of the bulb 14. The seal height should provide adequate compression. Adequate compression means reduction of the seal height between from 35% to 65%, preferably between from 45% to 55%, and/or preferably 50% compression. If the seal does not have the adequate height (for example, the bulb is too short), when the slide-out room is closed, the bulb is barely touched resulting in minimal compression and not adequate seal.

Seal 10 may comprise materials with different durometer or density. Said difference in density is shown in the drawings as different shades (for illustration purposes only). The lower durometer or lower density is represented with sideway lines; whereas, the higher durometer or density is represented in solid color. As shown, bulb 14 comprises a material with lower durometer or lower density than the base 12. For example, the bulb may comprise a material with a density of approximately 0.750 $g/cm^3$ and the base may comprise a material with a density of approximately 1.250 $g/cm^3$. The higher durometer material provides for stability of the seal.

The seal 10 may further comprise a flap 42. The flap 42 extends co-linearly with the base 12 and comprises a proximal end, a distal end and substantially parallel lateral sides. The flap 42 is integrally joined to the base at the proximal end. The flap 42 is made out of the same or similar material to that of the bulb, i.e. material with lower durometer than of the base. The flap is adapted to wipe away water from the seal base and bulb further providing for a watertight seal.

Figure 6:
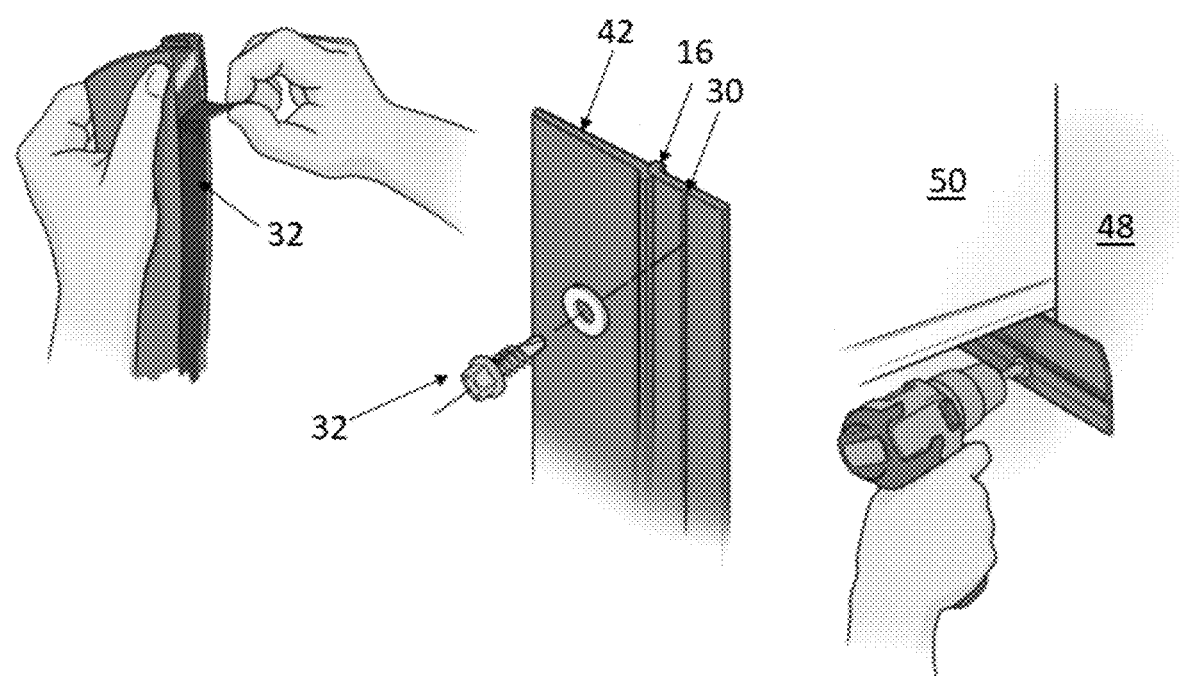
FIG. 6 is an illustration of the installation of the seal on a slide-room opening.
Figure 7:
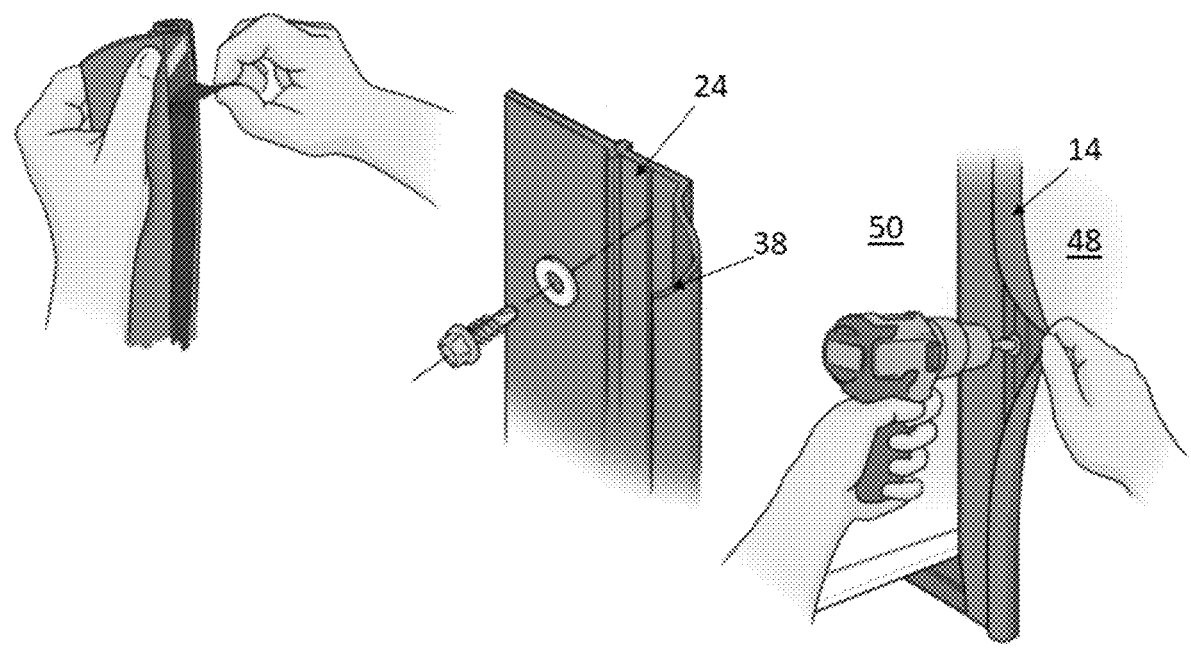
FIG. 7 is an illustration of the installation of the seal on a slide-room opening.

When a slide-out room is added to a recreational vehicle, it is very important to properly seal the opening on the recreational vehicle wall, where the slide-out room is placed. As shown in FIGS. 6 and 7, and as explained above, the currently disclosed seal is adapted to provide a watertight seal in slide-out room openings in recreational vehicles both when the slide-out room is opened and closed. Said seal provides protection against both air and moisture infiltration.

Seal 10 is placed on the recreational vehicle wall 48. Seal 10 comprises base 12, bulb 14, alignment aid member 16, and positional member 18. Alignment aid member 16 is adapted to provide guidance on the placement of the seal. The alignment aid member 16 is placed on the edge of the recreational vehicle wall where said wall ends. The alignment aid member 16 nests against the edge of the wall allowing straight placement of the seal.

The seal is secured to the recreational vehicle wall 48 by fastening system 32. The fastening system may include, but not limited to, adhesive tape, at least one fastener, or staples. The fastening system 32 may be placed on the outside portion of the seal base, on the inside portion of the base, or both. For example, as shown in FIGS. 6 and 7, the seal is secured to the recreational vehicle wall using adhesive tape. The curled end portion of bulb 14 is opened providing access to the recess 30 located on the inside portion of the base 12. The recess 30 is adapted for the placement of a fastening system, such as at least one fastener. Thus, the seal is further secured to the recreational vehicle wall by the at least one fastener.

Seal 10 may further comprise flap 42. Flap 42 is adapted to span the gap between the end of the recreational vehicle wall 48 and the slide-out room wall 50. The flap 42 is also adapted to divert water away from the base and bulb of the seal. The flap is made of lower density material allowing for a grade of deformation. When the slide-out room is closed, the flap curves inwardly towards the recreational vehicle preventing water from entering the interior of the recreational vehicle. When the slide-out room is open, the flap curves outwardly spanning the gap between the slide-out room wall and the recreational vehicle wall.

As the slide-out room closes, the slide-out room pushes against the bulb compressing the bulb. In order for the seal to prevent infiltration of air and/or moisture, it is very important for the bulb not to completely flatten out when the same is compressed. The positional member 18 is adapted to maintain the bulb shape by providing the bulb a place to push against; thus, preventing the bulb from completely flattening out when the bulb is compressed. Further, the positional member 18 serves as a visual aid for the placement of the seal on the recreational vehicle. When the seal is being installed, the alignment aid member cannot be seen. Since the positional member 18 extends perpendicularly to the base and in opposite direction of the alignment aid member, the positional member serves as a visual guidance for the placement of the seal.

While this invention has been shown and described with respect to a detailed embodiment thereof, it will be understood by those skilled in the art that changes in form and detail thereof may be made without departing from the scope of the claims of the invention.

What is claimed is:

1. A seal device comprising: a base; a bulb; an alignment aid member; and a positional member, the base comprising a proximal end, a distal end, an inside portion, an outside portion, and a perpendicular member, said perpendicular member extending perpendicularly to the base proximal end towards the bulb, the bulb comprising an arcuate portion, a sidewall portion and a curled end portion, wherein the arcuate portion is integrally joined to the sidewall portion on one side and to the curled end portion on the other side, wherein a free end of the curled end portion defines an opening connecting an interior of the bulb to an exterior environment when the bulb is in an undeformed state, wherein the curled end portion extends towards the sidewall portion, the free end of the curled end portion not directly attached to the sidewall portion, and the positional member extending perpendicularly to the base distal end in opposite direction of the alignment aid member.

2. The seal device as claimed in claim 1, the seal device further comprising a flap extending co-linearly from the base distal end.

3. The seal device as claimed in claim 2, wherein the flap comprises a material of lower density than the base.

4. The seal device as claimed in claim 1, wherein the sidewall portion of the bulb is joined to the base perpendicular member and the curled end portion of the bulb is unattached.

5. The seal device as claimed in claim 1, wherein the bulb comprises a material of lower density than the base.

6. The seal device as claimed in claim 1, wherein the base further comprises a fastening system.

7. The seal device as claimed in claim 6, wherein the base fastening system is located on the outside portion of the base, the fastening system comprising adhesive tape.

8. The seal device as claimed in claim 6, wherein the base fastening system is located on the inside portion of the base, the fastening system comprising at least one fastener.

9. The seal device as claimed in claim 1, the base further comprising a recess.

10. The seal device as claimed in claim 1, wherein the bulb has a width between from 0.85 and 1.05 inches.

11. The seal device as claimed in claim 1, wherein the bulb has a height between from 0.75 and 0.95 inches.

12. The seal device as claimed in claim 11, wherein the bulb comprises a material which provides a seal height compression between from 45% to 65%.

13. A sealing system comprising: a seal capable of sealing slide-out room opening in a recreational vehicle, the seal comprising: a base, a bulb, an alignment aid member, a positional member, and a fastening system, the fastening system comprising adhesive tape, the base comprising a proximal end, a distal end, an inside portion, an outside portion, a recess, and a perpendicular member, said perpendicular member extending perpendicularly to the base proximal end towards the bulb, the bulb comprising an arcuate portion, a sidewall portion and a curled end portion, the arcuate portion is integrally joined to the sidewall portion on one side and to the curled end portion on the other side, the sidewall portion integrally joined to the perpendicular member of the base, a free end of the curled end portion defines an opening connecting an interior of the bulb to an exterior environment when the bulb is in an undeformed state, the curled end portion extends towards the sidewall portion, the free end of the curled end portion not directly attached to the sidewall portion, and the positional member extending perpendicularly to the base distal end in opposite direction of the alignment aid member, wherein the alignment aid member is adapted to guide placement of the seal on a wall of the slide-out room opening on the recreational vehicle, wherein the fastening system is adapted to guide placement of the seal along an edge of the wall of the slide-out room opening on the recreational vehicle, wherein the bulb is adapted to be moved between an open position and a closed position, the open position allowing access to the inside portion of the base, wherein the positional member is adapted to prevent the bulb from completely flattening out against the base when the bulb is pressed.

14. The sealing system as claimed in claim 13, wherein the fastening system further comprises at least one fastener, the recess adapted to allow placement of said at least one fastener on the base to secure the seal to the wall of the slide-out room opening on the recreational vehicle.

15. The sealing system as claimed in claim 13, the seal further comprising a flap extending co-linearly from the base distal end, the flap adapted to divert water away from the base and bulb.

16. The seal system as claimed in claim 15, wherein the flap comprises a material of lower density than the base.

17. The seal system as claimed in claim 13, wherein the bulb comprises a material of lower density than the base.

18. The seal system as claimed in claim 13, wherein the bulb has a width between from 0.85 and 1.05 inches.

19. The seal system as claimed in claim 13, wherein the bulb has a height between from 0.75 and 0.95 inches.

20. The seal system as claimed in claim 19, wherein the bulb comprises a material providing a seal height compression between from 45% to 65%.

\* \* \* \* \*